US010345567B2

(12) United States Patent
Degen et al.

(10) Patent No.: US 10,345,567 B2
(45) Date of Patent: Jul. 9, 2019

(54) LASER SCANNING MICROSCOPE

(71) Applicant: CARL ZEISS MICROSCOPY GMBH, Jena (DE)

(72) Inventors: Artur Degen, Jena (DE); Daniel Schwedt, Weimar (DE); Michael Gölles, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 701 days.

(21) Appl. No.: 13/968,220

(22) Filed: Aug. 15, 2013

(65) Prior Publication Data
US 2014/0055851 A1     Feb. 27, 2014

(30) Foreign Application Priority Data

Aug. 16, 2012   (DE) .................. 10 2012 016 346

(51) Int. Cl.
*G02B 21/06* (2006.01)
*G02B 21/00* (2006.01)
*G02B 21/02* (2006.01)

(52) U.S. Cl.
CPC ..... *G02B 21/0072* (2013.01); *G02B 21/0056* (2013.01); *G02B 21/0076* (2013.01); *G02B 21/02* (2013.01)

(58) Field of Classification Search
CPC .... G02B 21/06; G02B 21/0076; G02B 21/16; G02B 21/0032; G02B 21/367
(Continued)

(56) References Cited

U.S. PATENT DOCUMENTS

| 2009/0236549 A1* | 9/2009 | Vogt ................... G01J 3/02 250/578.1 |
| 2010/0014155 A1* | 1/2010 | Hayashi ............ G02B 21/0068 359/380 |

FOREIGN PATENT DOCUMENTS

| DE | 19702753 A1 | 7/1998 |
| DE | 102008049885 A1 | 4/2010 |

(Continued)

OTHER PUBLICATIONS

Gobel, Werner et al., "Imaging cellular network dynamics in three dimensions using fast 3D laser scanning", Nature Methods, 2007, vol. 4, No. 1, pp. 73-79.*

*Primary Examiner* — William R Alexander
*Assistant Examiner* — Tamara Y Washington
(74) *Attorney, Agent, or Firm* — Westerman, Hattori, Daniels & Adrian, LLP

(57) ABSTRACT

A laser scanning microscope having a laser source for fluorescence excitation; a scanning mirror arrangement for scanning a specimen and scanning optics for generating a diffraction-limited reference image plane as a first intermediate image plane; an optical system for demagnified imaging of the reference plane in a second intermediate image plane; an axially slideable mirror in the second intermediate image plane; a beam splitter arrangement between the reference image plane and the optical system; and a tube lens and a first microscope objective for imaging of the reference image plane into a specimen. The imaging of the image is effected with a magnification of M≠n/n' and/or a magnification of the second intermediate image plane into the specimen according to the equation (Continued)

$$M = \frac{y'}{y} = \frac{n}{n'}\xi,$$

with $|\xi|\neq 1$, and/or the focal plane of the laser deviates from the axial position of the axially movable mirror across its scanning area in the second intermediate image plane.

19 Claims, 6 Drawing Sheets

(58) Field of Classification Search
USPC ....... 359/383, 362, 377, 378, 656–661, 719, 359/385, 380; 368/362; 377/376; 382/392, 74; 384/368; 367/362; 644/660, 661; 646/661; 656/642, 643; 358/362
See application file for complete search history.

(56) References Cited

FOREIGN PATENT DOCUMENTS

| | | |
|---|---|---|
| EP | 0835423 A1 | 4/1998 |
| EP | 0500717 B2 | 11/2003 |
| EP | 0932845 B1 | 1/2008 |
| EP | 2146235 A1 | 1/2010 |
| WO | 2008/078083 A1 | 7/2008 |

* cited by examiner

LASER SCANNING MICROSCOPE

CROSS-REFERENCE TO RELATED APPLICATIONS

The present patent application claims priority from German Application No. 10 2012 016 346.0, filed Aug. 16, 2012, which is incorporated herein by reference in its entirety.

BACKGROUND OF THE INVENTION

1. Field of the Invention

The present invention relates to a scanning microscope which is capable of quickly examining relatively thick live biological specimens via three-dimensional imaging, with minimum impact of the optical array on the detected specimen image.

2. Description of Related Art Including Information Disclosed Under 37 CFR §§ 1.97 and 1.98

Over the past few decades, laser scanning microscopy has developed into a powerful tool in biomedical research. The basis for this development is mainly the excellent depth discrimination provided by confocal detection methods or multiphoton excitation. As biological specimens are three-dimensional objects, and movements, such as vesicle migration within cells, generally also have a component in the direction of the optical axis of the microscope objective, or the crosslinking within a three-dimensional neuronal network is to be examined, for instance, it is desirable to be able to quickly switch between specimen planes being examined. Furthermore, especially in live cell research, it is advantageous when the inspection object is subjected to as few disturbances as possible.

According to the prior art (e.g. Zeiss LSM510, 710, DE 19702753A1), the exciting laser is focused into the specimen via a microscope objective, the distance of which to the specimen is preferably adjusted by means of a piezo-actuated adjusting element. Due to the considerable mass of an objective, its adjusting speed is limited, and the scanning rate along the optical axis thus does not exceed a few tens of hertz. Lastly, the specimen-dependent penetration depth that can be achieved determines whether linear or multiphoton excitation should be used. A typical example in which rapid, three-dimensional scanning is of particular interest is described below.

Multiphoton excitation microscopy (e.g. EP 500717 B2) is the preferred method for microscopy of thick specimens of a few hundred microns, which require deep penetration. Multiphoton microscopy is particularly suitable for that purpose, as it employs excitation light in the near infrared range and is thus much less prone to elastic scattering and therefore able to create a clean focus even with deeper depths of penetration. As excitation of the fluorescent molecules at high power density can only be achieved via multiphoton processes, the excitation can only come from the focus itself. Although, as a result of its shorter wavelength, the fluorescence is subject to a larger scattering cross-section in the specimen which leads it to lose its spatial information, its point of origin is known a priori as a result of multiphoton excitation. Thus one merely has to ensure that all the photons that are collected through the objective opening are imaged on a detector located on a plane that is conjugated towards the pupil of the objective.

One of the fields in which this technology is typically employed is brain research, which examines neuronal networks in the brains of live small animals. This requires parallelization of the study of optical and electrical signals, wherein both channels—the optical and the electrical channel—are used for stimulation and evidence of neuronal activity. Such an experiment will therefore usually be conducted at the open brain of an anesthetized small animal, with electronic probes in the form of needles being connected to certain neurons. Then excitation is achieved with a multiphoton laser, usually a femtosecond laser in the near infrared range, via a high NA objective having a long working distance, and the generated fluorescence is collected and projected towards a detector (preferably not descanned). The objective is either a dry objective or an objective with water as the immersion solution. No coverslip is used in most cases, but the brain can be sealed with one if necessary, as long as it is without electrical access. In any case, care should be taken not to interfere with the sensitive specimen and to avoid conflicting space requirements with the highly sensitive electrical probes connected, when imaging axial image stacks.

In addition, it is important to very quickly target previously defined points in a three-dimensional section of interest in the specimen and specifically illuminate the neuron in question in experiments that require optical neuronal stimulation. Therefore, quick and non-interacting focusing is desirable.

The Prior Art and its Disadvantages

Focusing Via Piezomechanical Objective Adjustment

The easiest way to achieve defocusing of the examined specimen plane within a range of a few hundred micrometers is to hold the objective with a piezomechanically supported frame in order for a variation of the piezovoltage to lead to a shift of the objective along the optical axis. The applicative use of this method was impressively demonstrated in W. Göbel et al; *Nature Methods* 4, 73 (2007), for instance. However, the disadvantages immediately become evident. The exciting and observing objective oscillates relative to the specimen, transfers mechanical waves onto the specimen through the immersion medium and drastically limits where electrical probes can be placed. The piezo drive furthermore must move the mass of the objective, which limits the axial actuating speed that can be achieved.

WO 2008/078083 (see also FIG. 1): In order to image any plane in the object in a fully corrected manner on the sensor and to maintain a constant distance between specimen and objective while refocusing, this concept preferably encompasses three sequentially illuminated, identical microscopes (objective and tube lens as illustrated in FIG. 1), two of which stand back-to-back in order for the aberrations thereof to cancel out. The joint corrected intermediate image (shown as a dotted line) is the interface between the two microscopes. The result is an aberration-free 3D copy of the object that is magnified by the ratio the refractive indices of the immersion media. This virtual object is projected onto a detector by a third microscope, with the axial position of the object determining the focal plane within the virtual object. In another variant, through the use of a mirror within the virtual object, the second and third microscope can be replaced with a single microscope.

Due to the use of high NA objectives, the generated intermediate image has a high degree of detail resolution. If the focal plane of interest is chosen via a mirror placed in the intermediate image and adequate beam splitting means in the space between the objectives, a variation of the viewed image plane can be achieved very quickly, as the mirror can be very small and thus only presents little mass to be accelerated. The drawback of this solution is that the two objectives creating the intermediate image need to be synchronized to each other, which means that a change of objectives must occur synchronously. The use of a mirror in the intermediate image plane further leads to the mirror being projected (clearly, depending on the selected focal plane) in the intermediate image onto the detector, thus inevitably introducing image artifacts. Dust deposits and scratches on the mirror have a particularly negative impact, and dust can burn into the surface of the mirror.

EP0835423 relates to a confocal microscope for fast height measurements for quality control in the production of integrated circuits. For this purpose, a miniature mirror array is moved quickly and sinusoidally in the axial direction within an intermediate image, analogous to WO 2008/078083. However, in this case, the mirror provided is not a simple plane mirror, but a retroreflector generating a beam displacement. The resulting field division removes the necessity of beam-splitting within the infinite space between the objective and tube lens, which on the one hand brings an advantage in terms of the light efficiency, but limits the use of the array to rather small numerical apertures on the other. This array is therefore not suitable for fluorescence microscopy with an aperture requirement of NA>1.

EP2146235A1 expands WO2008/078083 by a zoom lens with few zoom factors, which softens the tough conditions for adjustment between the two microscopes standing back-to-back. In this manner, production tolerances with regard to the magnification of the objectives or variations of the refractive index (temperature or pH value) can be absorbed. It, however, does not solve the above-mentioned problem regarding image artifacts.

DE 102008049885 addresses the difficulties in reducing the considerable losses with regard to object lighting when passing through an array as described in WO2008/07083, which protects arrays for pupil or polarization division with non-axial entry into the back aperture of the microscope objective. The problem with pupil division is that it remains limited to smaller numerical apertures and smaller fields of vision. The variant with the polarizing beam splitter and the non-axial objective application also creates artifacts due to the positioning of the mirror in the intermediate image.

EP932845B1 (FIG. 2): The purpose of this approach is to project the surface of an object so that it looks larger (or smaller) and is diffraction-limited onto a sensor, whereby the axial position of the object may vary within certain limits and therefore is not known a priori. The proposed solution is to design the optical system in such a manner that, with one single transillumination process, the light is projected with limited diffraction onto the sensor from a maximum volume from the object space through mediation between the degree to which the sine and Herschel conditions are fulfilled. The image on the sensor is therefore afflicted with compromise with regard to the lateral field size and the axial depth of focus, but a variability of the axial position of the object is absorbed to a certain degree.

The optical system itself is not described, but a process for its design and production.

BRIEF SUMMARY OF THE INVENTION

The aim of the invention described herein is to design a scanning microscope which is capable of quickly examining relatively thick live biological specimens via three-dimensional imaging, with minimum impact of the optical array on the detected specimen image.

The purpose of the approach shown schematically in FIG. 3 and further illustrations is to image any plane within the object in a chromatically diffraction-limited—in particular with regard to monochromatic aberrations on the axis and in the field as well as chromatic errors—and corrected manner onto the sensor. The invention further concerns chromatically diffraction-limited imaging of a reference-first intermediate image plane illuminated by a scanned and intensity-modulated laser into the object, with the fluorescence thus generated projected in a non-descanned manner onto a sensor in a plane conjugate to the objective pupil. When refocusing, the distance between specimen and objective remains constant. In addition, no laser foci are placed on the optical surfaces.

To this end, the corrected image created by a microscope (or of said reference plane) is imaged into a further, but strongly aberrant image space by means of an optical system. A mirror axially movable therein reflects the light back onto itself. After passing again through the optical system, the image data is reflected out via appropriate polarization optics PBS. A chromatically diffraction-limited image is projected onto a sensor S (or the image plane of the microscope), as the aberrations caused by the optical system are canceled out by the backward use. The mirror in the aberrant image plane determines the viewed (or illuminated) object plane.

The solution presented herein is based on the principle described inter alia in WO2008/078083, but said principle is modified essentially and surprisingly in such a manner, that quick, interaction-free 3D-imaging of thick, live specimens can be accomplished over axial stacking depths of more than 100 μm without a sharp image of the mirror ever being created for the selection of the viewed focal plane. Moreover, the objective can be changed within certain limits while adhering to the magnification specifications through motorized adjustment of the light beam path without any significant compromise in image quality.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1:
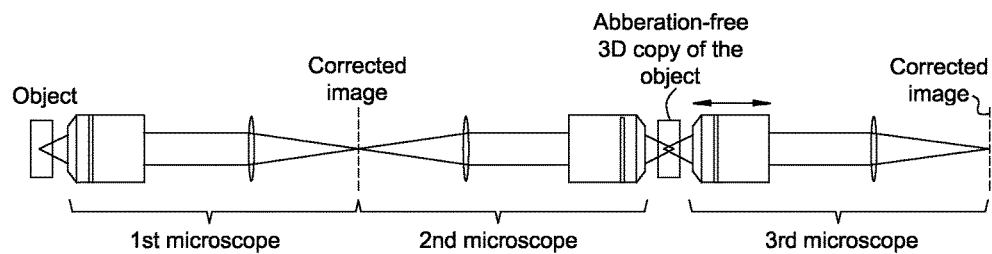
FIG. 1 is a schematic illustration of three sequentially illuminated, identical microscopes (objective and tube lens) as described in WO 2008/078083.
Figure 2:
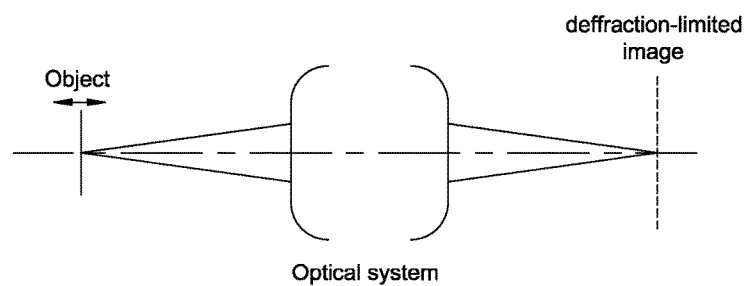
FIG. 2 is a schematic illustration of an optical system as described in EP932845B1, in which, with one single transillumination process, the light is projected with limited diffraction onto the sensor.
Figure 3:
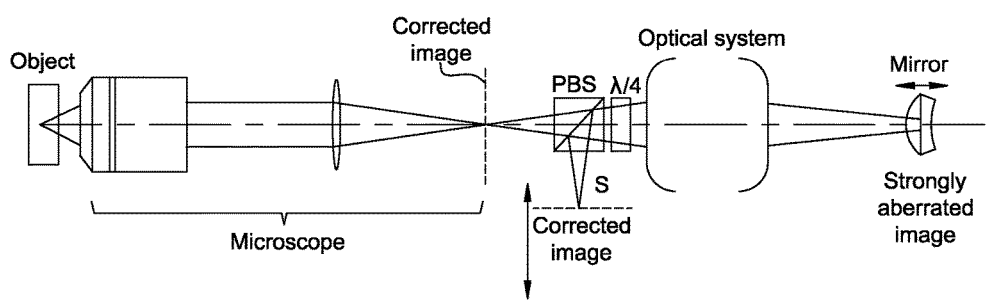
FIG. 3 is a schematic illustration of an optical system in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

A microscope according to the invention is characterized advantageously by the following components and technical designs:

Light source for excitation of fluorescence in biomedical specimens

Scanning mirror to scan the specimens via laser beam

Scan lens to produce an intermediate image by means of the excitation laser in order to define a reference image plane Polarizing beam splitter and quarter-wave plate to separate the passing incident and reflected excitation light Adapted optical system comprising a tube lens and microscope objective, which produces a demagnified and aberrant intermediate image of the reference plane An element within the above-mentioned intermediate image plane, which reflects the laser beam back through the adapted optical system, which comprises a microscope objective and tube lens A further system comprising a tube lens and microscope objective which focuses the laser beam into the specimen, the imaging of said intermediate image plane into the specimen being effected with a magnification of $$M = \frac{y'}{y} = \frac{n}{n'}\xi \qquad \text{(equation 10)}$$

Element for the spectral separation of fluorescent light and excitation light returning from the specimen A detector for the registration of fluorescent light emitted from the specimen, located behind the spectral separation element as well as suitable imaging optics The light source is an NIR laser for multiphoton excitation of fluorescence in biomedical specimens The light source is a VIS laser for excitation of fluorescence in biomedical specimens The polarizing beam splitter and the quarter-wave plate are cemented to one another The system comprising a tube lens and microscope objective is designed as a single compact objective optics The system comprising a tube lens and microscope objective is arranged as a displaceable unit along the optical axis The element, in the intermediate image plane, that reflects the laser beam back through the system comprising a microscope objective and tube lens, is a planar mirror The element, in the intermediate image plane, that reflects the laser beam back through the system comprising a microscope objective and tube lens, is a spherical mirror The element, in the intermediate image plane, that reflects the laser beam back through the system comprising a microscope objective and tube lens, is an aspherical mirror The element, in the intermediate image plane, that reflects the laser beam back through the system comprising a microscope objective and tube lens, is a reflecting prism The element, in the intermediate image plane, that reflects the laser beam back through the system comprising a microscope objective and tube lens, is a free-form mirror The element, in the intermediate image plane, that reflects the laser beam back through the system comprising a microscope objective and tube lens, is a free-form reflecting prism The element, in the intermediate image plane, that reflects the laser beam back through the system comprising a microscope objective and tube lens, is mounted in an axially adjustable manner The element, in the intermediate image plane, that reflects the laser beam back through the system comprising a microscope objective and tube lens, is mounted in an axially adjustable manner, wherein the adjustment is achieved preferably by means of a piezo drive A movable beam deflector is arranged between the polarizing beam splitter and the system on the specimen side, which movable beam deflector optimizes the position of the intermediate image on the specimen side for the selected system comprising a tube lens and microscope objective including immersion medium in interaction with the axial position of the intermediate image mirror for the projection of the excitation laser into the specimen A means for non-descanned detection of the generated fluorescent light The element for the spectral separation of fluorescence and excitation light is an edge filter, which is located behind the microscope objective on the specimen side for non-descanned detection The element for the spectral separation of fluorescence and excitation light is a color filter, which is located within the system made up of microscope objective and tube lens and reflects visible laser light and transmits linearly excited fluorescence signals from the specimen Linear Fluorescence:

A second microscope objective within the system comprising a microscope objective and tube lens, which is located in transmission behind the above-mentioned color filter and images the linearly excited fluorescence in an image plane A pixel detector in an image plane behind the second microscope objective, which pixel detector registers the linearly excited fluorescence The pixel detector is mounted in an axially slideable manner The pixel detector is mounted in an axially slideable manner, the sliding action preferably being achieved by means of a piezo element The sliding of the detector within the image plane of the second and reflecting element in the image plane of the first microscope objective within the system comprising a microscope objective and tube lens is effected in synchronization The pixel detector is a CCD The pixel detector is a CMOS The pixel detector is an EMCCD Only a few of the pixel detector's pixels are used for confocal imaging (selected electronically or by means of software)

The principle behind the array described in WO2008/078083 is based on the simultaneous fulfillment of the sine and the Herschel conditions. The sine condition is the condition for the perfect imaging of small lateral surfaces. Let (y, z) and (y, z') be the coordinates of points on y and z axes in the object space and (y, z) be the coordinates of points on y' and z' axes in the image space, where the z and z' axes coincide with the optical axis and the y and y' axes are orthogonal to z and z', respectively. The Herschel condition is the condition for the perfect imaging along the optical axis. If both conditions are met, they lead to the perfect imaging of a small volume. The sine condition can be described as follows:

$$n \times y \times \sin \alpha = n' \times y' \times \sin \alpha' \quad (1)$$

where n is the refractive index in the object space and n' is the refractive index in the image space; and $\alpha$ is the angle of a ray relative to the optic axis where it leaves the point (y, z) in the object plane and $\alpha'$ is the angle of the same ray relative to the optic axis where it reaches the point (y', z') in the image plane.

The Herschel condition is obtained by:

$$n \times z \times \sin^2 \alpha/2 = n' \times z' \times \sin^2 \alpha'/2 \quad (2)$$

Figure 3:
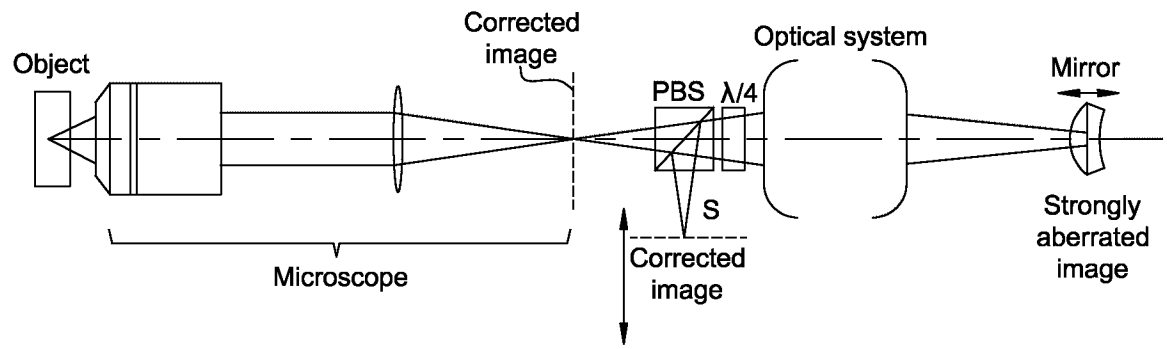
Figure 3A:
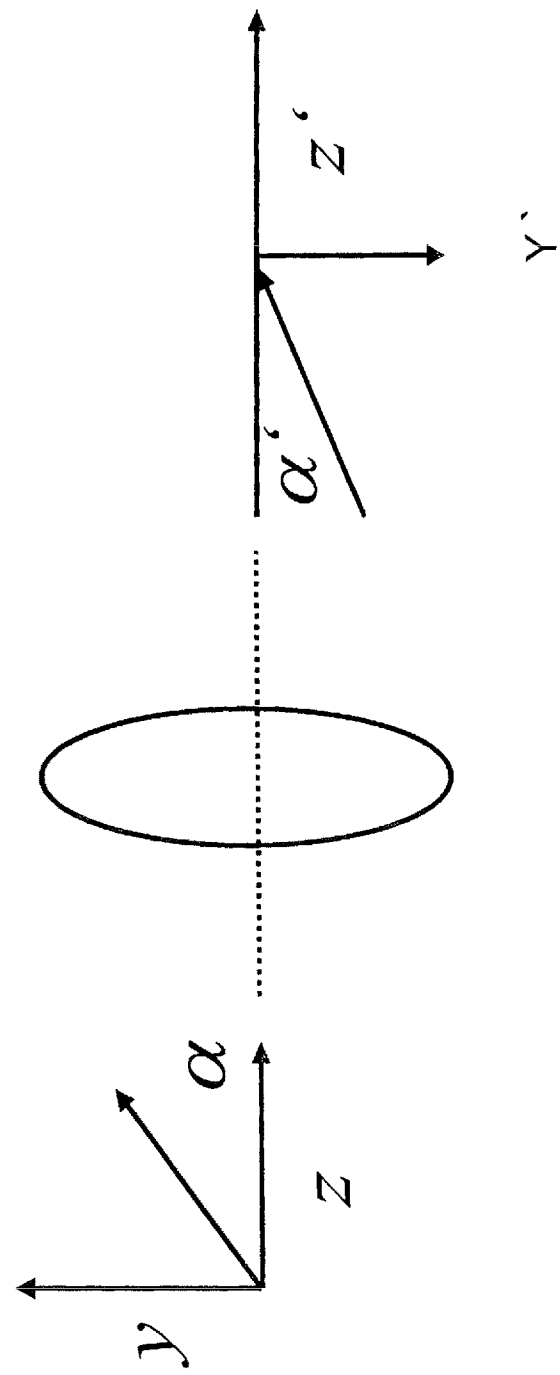
FIG. 3a is a schematic illustration of the simultaneous fulfillment of the sine and the Herschel conditions.

The identifiers are shown in FIG. 3a, in which the dotted lines represent the image space.

The following applies to small z and z':

$$\frac{z'}{z} = \frac{n'}{n}\left(\frac{y'}{y}\right)^2 = \frac{n'}{n}M^2 \quad (3)$$

where M is the magnification:

$$M = \frac{y'}{y} \quad (4)$$

(3) inserted into (2) results in:

$$n \times y \times \sin \alpha/2 = n' \times y' \times \sin \alpha'/2 \quad (5)$$

The quotient from (1) and (5) upon simplification according to the condition: $\alpha, \alpha \neq 0$ results in:

$$\cos \alpha = \cos \alpha' \quad (6)$$

For the angles in FIG. 3a this results in:

$$\alpha = |\alpha'| \quad (7)$$

The latter also applies to $\alpha, \alpha \neq 0$. Condition (7) is the condition for the simultaneous fulfillment of the sine and the Herschel conditions. This means that an aberration-free imaging of a small volume requires that the beam angle spectra in the object and the image space be identical.

The magnification of the imaging system with perfect volume imaging thus results from (1) upon application of (7) to obtain:

$$M = \frac{y'}{y} = \frac{n}{n'} \quad (8)$$

Figure 3B:
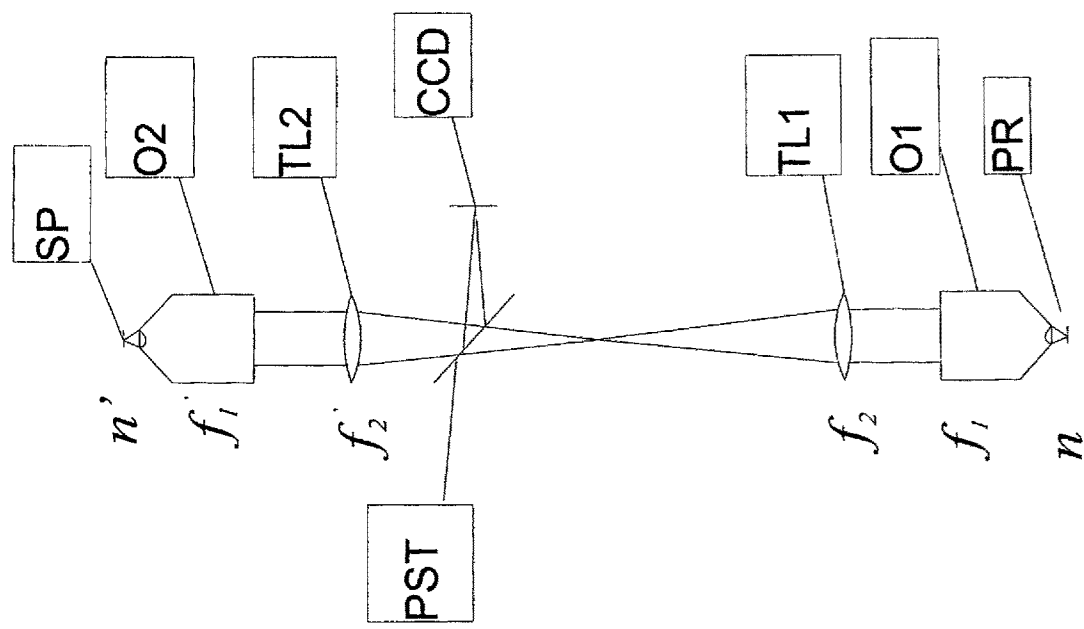
FIG. 3b shows a Z-focus adjustment according to WO2008/078083.
Figure 4:
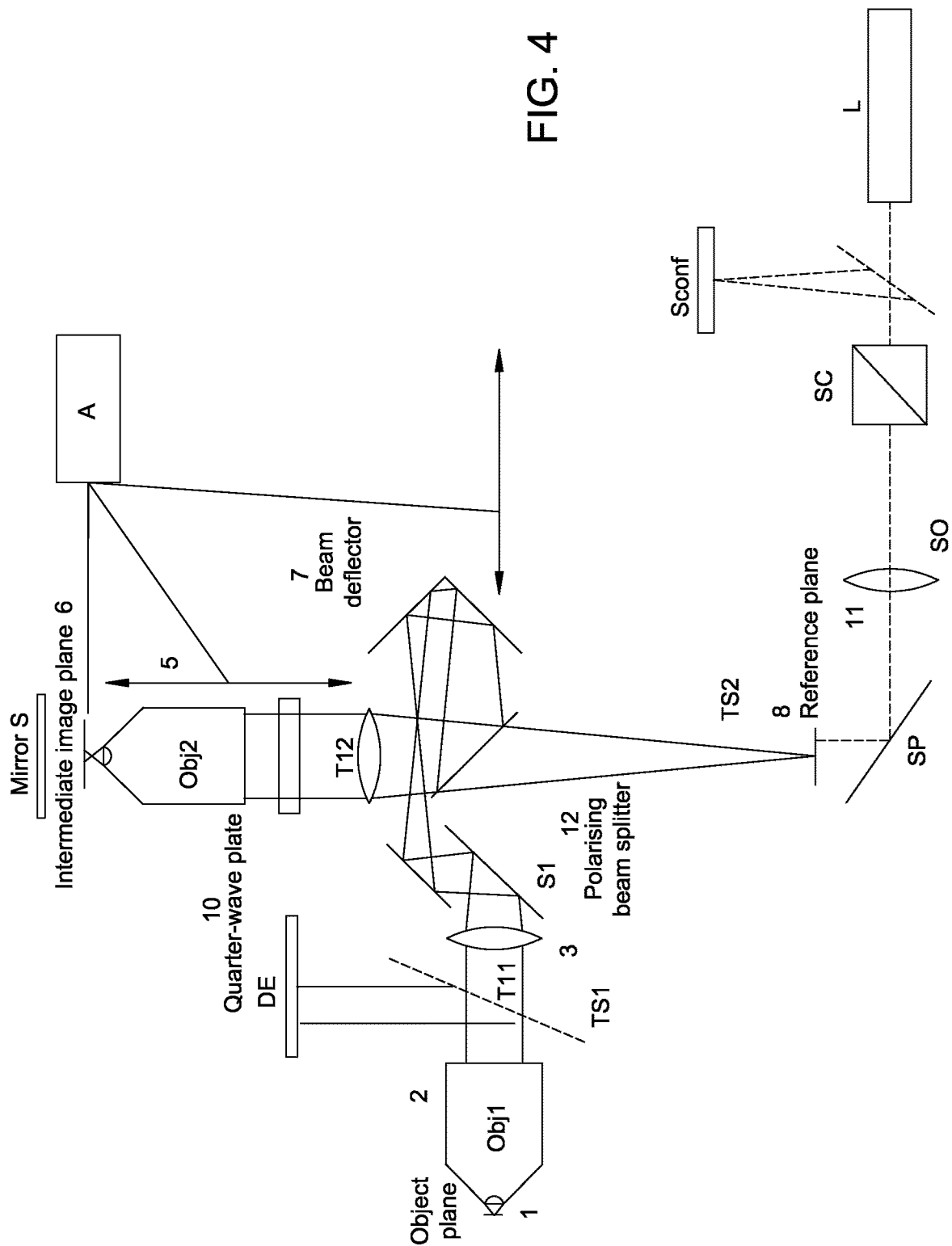
Figure 5:
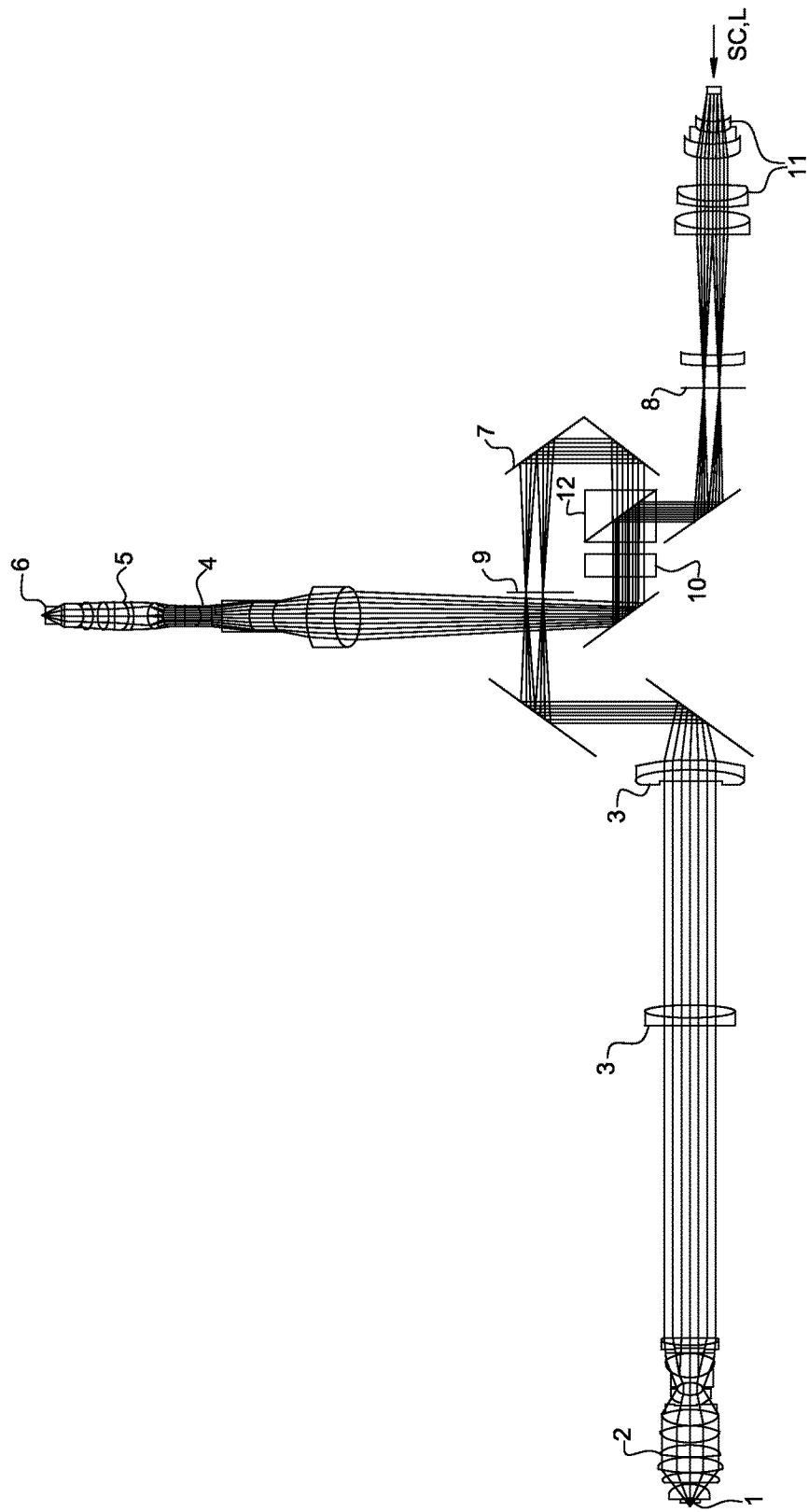
Figure 6:
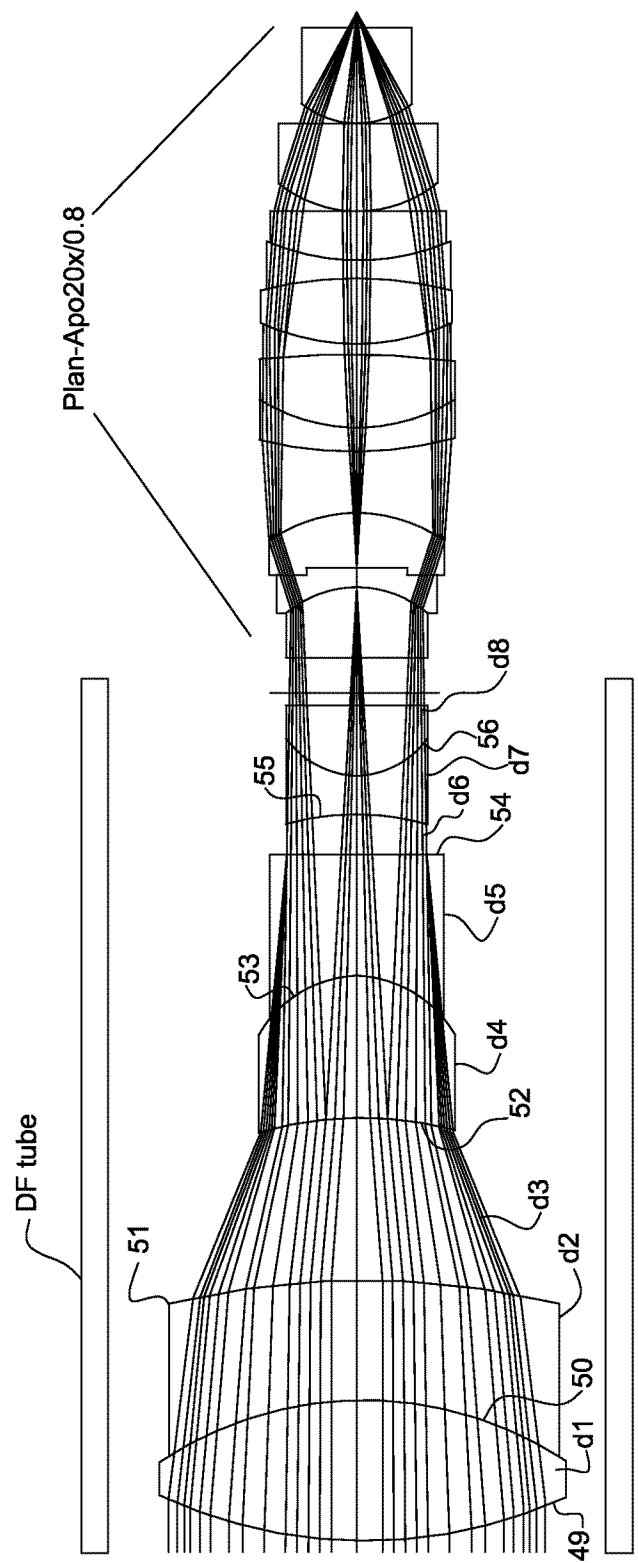
Figure 7:
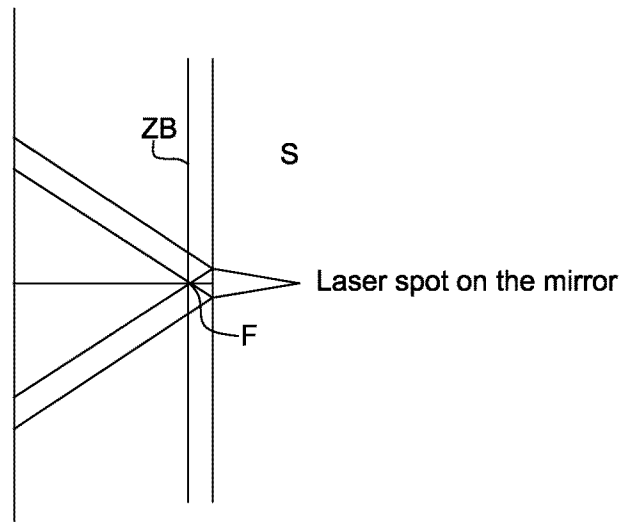
Figure 8:
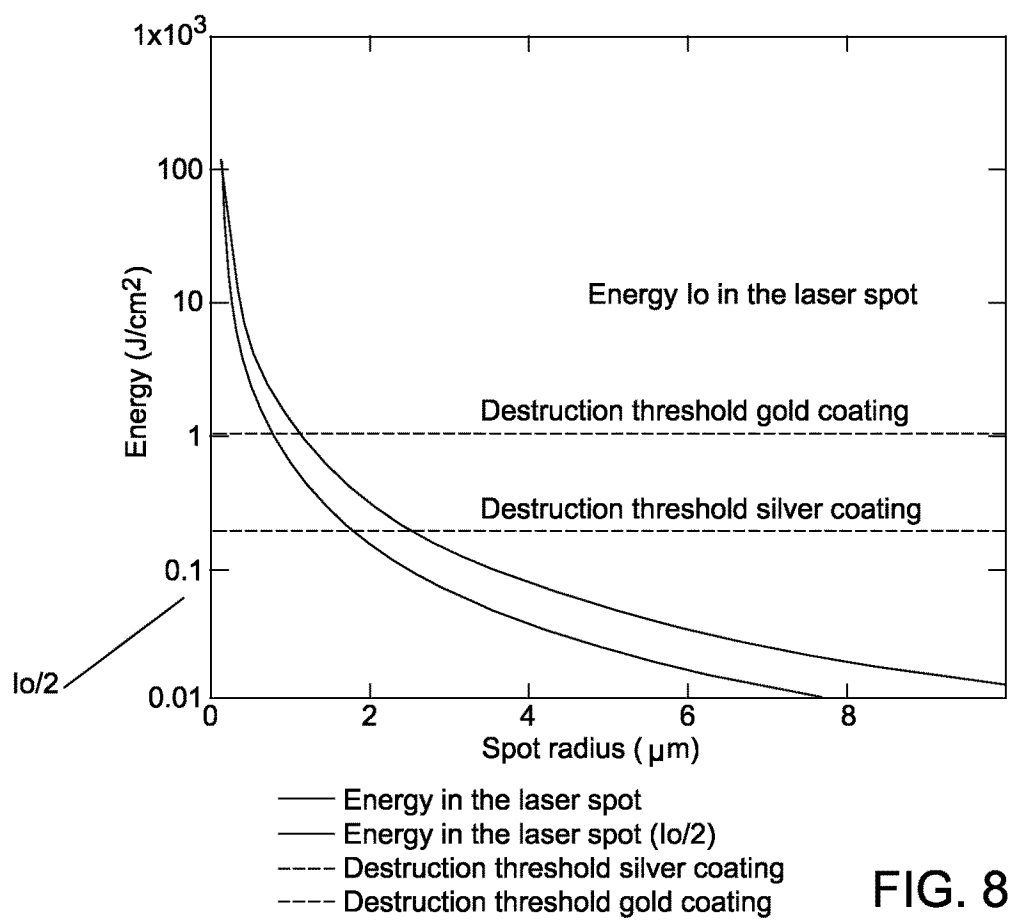
Figure 9:
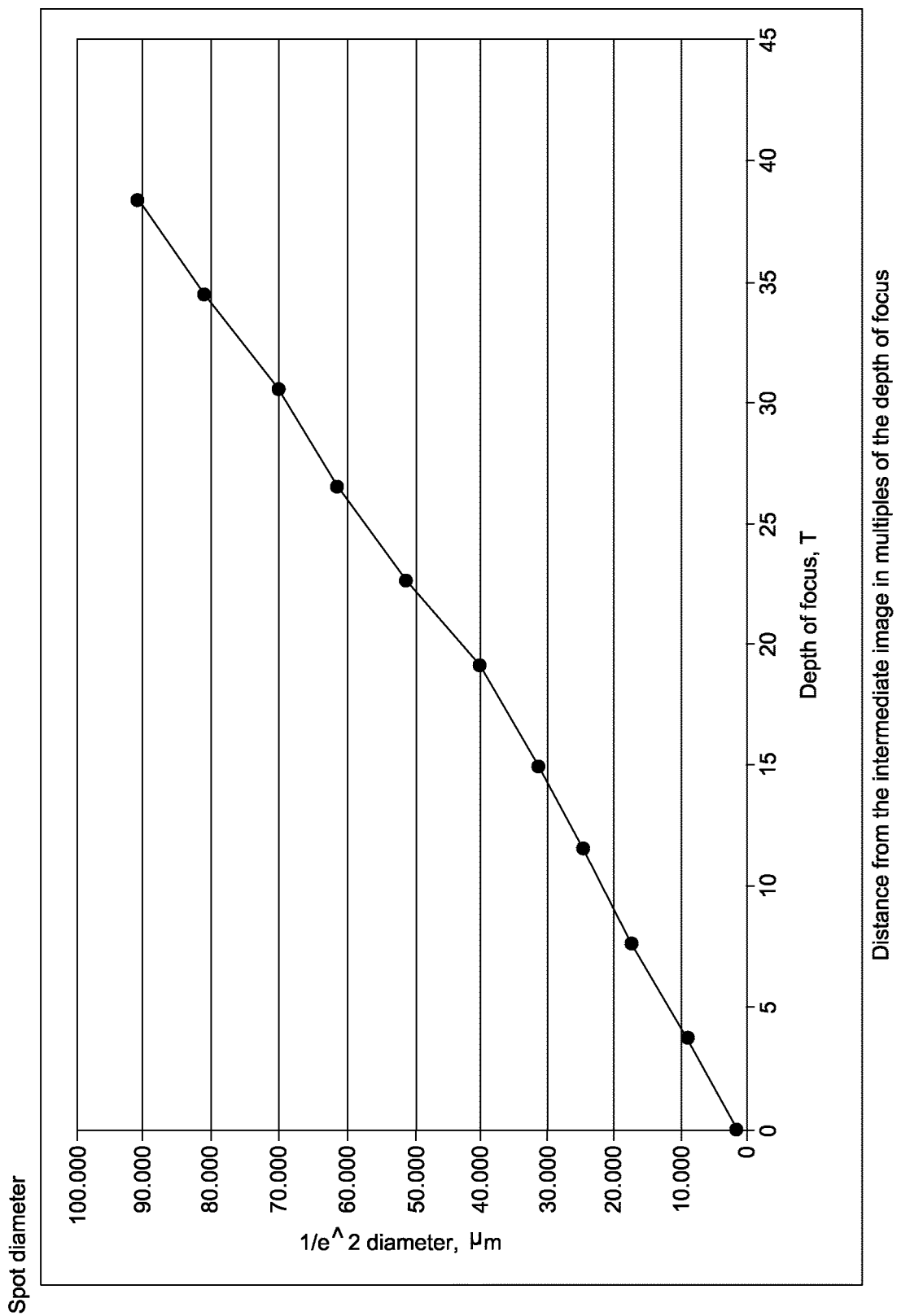

FIG. 3b shows a Z-focus adjustment according to WO2008/078083.

The abbreviations are: Pr—object; O1—objective 1; TL1—tube lens 1; TL2—tube lens 2; O2—objective 2; SP—mirror moveable along the optical axis; PST—polarizing beam splitter (splitter mirror); CCD—detector (CCD)

If the optical system is designed for fast focusing with the focal lengths and refractive indexes according to FIG. 3b), the following applies to the perfect volume imaging:

$$\frac{n}{n'}\frac{f_1}{f_2}\frac{f_2'}{f_1'} = 1 \quad (9)$$

Solution According to the Invention for Multiphoton Excitation:

In the solution according to the invention, an objective lens such as a ZEISS objective 5 (herein PlanApo 20x/0.8) corrects errors (aperture errors and defocus), which occur in a deep scan of an aqueous specimen with objective 2 (e.g. WPlanApo 20x/1.0).

For the purpose of the invention, however, a specially fitted tube lens TL2 was implemented, 4, for the correction objective in an advantageous embodiment of the invention, which initially further corrects Gauss errors, as the WPlanApo 20x/1.0 objective is well corrected for the VIS area, but used for NLO excitation in the NIR area (700-1200 nm). The correction of the system described herein extends over a range of excitation laser wavelengths of 800-1000 nm and has a detection range of the fluorescence excitation of approx. 380-800 nm.

The invention allows for further optical arrangements covering differing wavelength ranges.

Surprisingly, the imaging system described herein is advantageously additionally corrected in such a manner that the axially slideable mirror arranged in the aberration-free intermediate image space is not clearly projected into the specimen, but 1. The image is preferably defocused by more than 50 depths of field.

2. The system is, however, corrected in such a manner that it provides a clear image in the intermediate image space in front of the scan lens 11.

3. The system can be corrected for WPlanApo 20x/1.0 with and without a coverslip.

4. according to the invention, the magnification of the object into the aberration-free intermediate image space at the mirror according to equation 8 takes the following deviating form for the aberrated intermediate space at the mirror:

$$M = \frac{y'}{y} = \frac{n}{n'}\xi \quad (10)$$

with the solution $$|\xi| \neq 1$$

where $\xi$ is the factor by which the ratio $$\frac{n}{n'}$$

must be multiplied to equal the ratio $$\frac{y'}{y}.$$

FIGS. 4-9 show schematic representations of the proposed solution.

Figure 4:
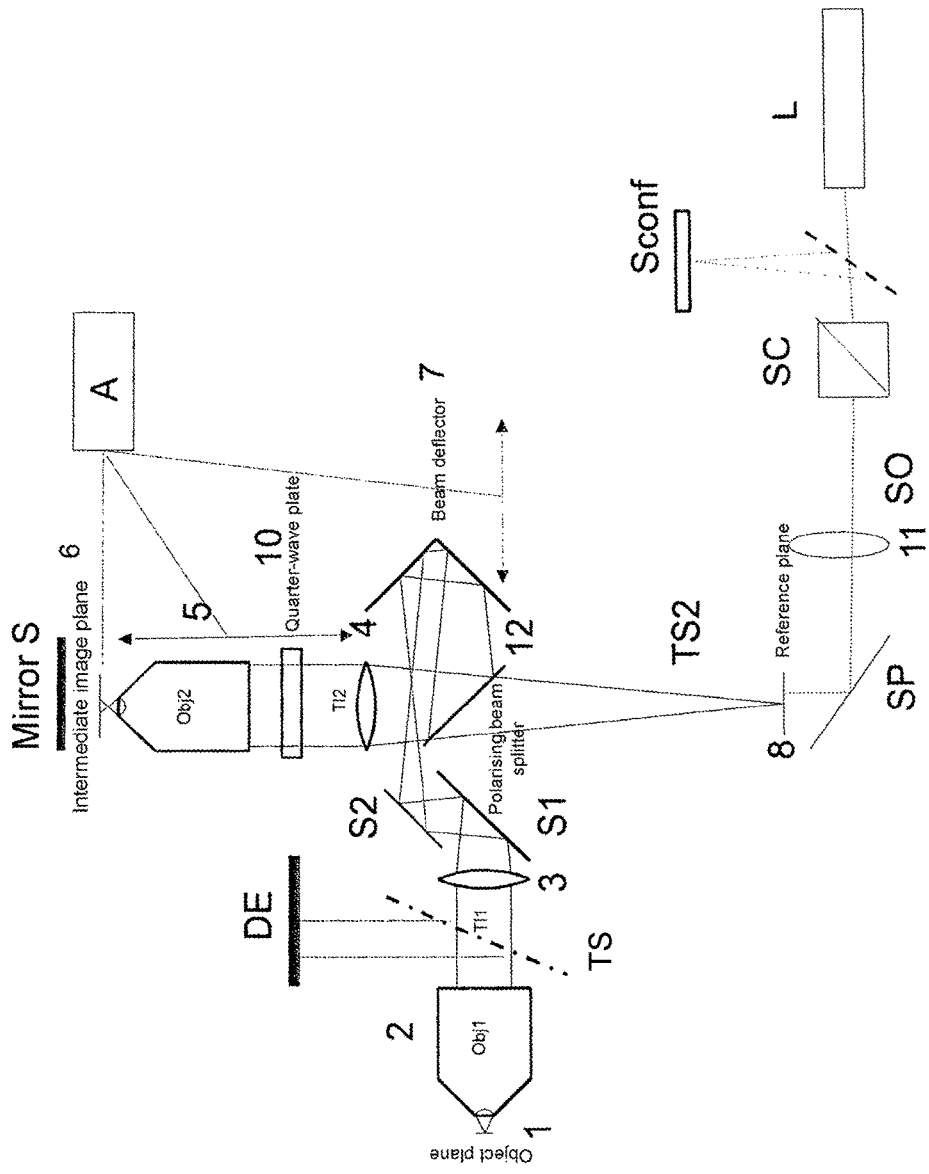
FIGS. 4 and 5 show the beam path according to the invention of a scanning microscope, preferably with pulsed laser illumination for multiphoton excitation in a schematic representation.
Figure 5:
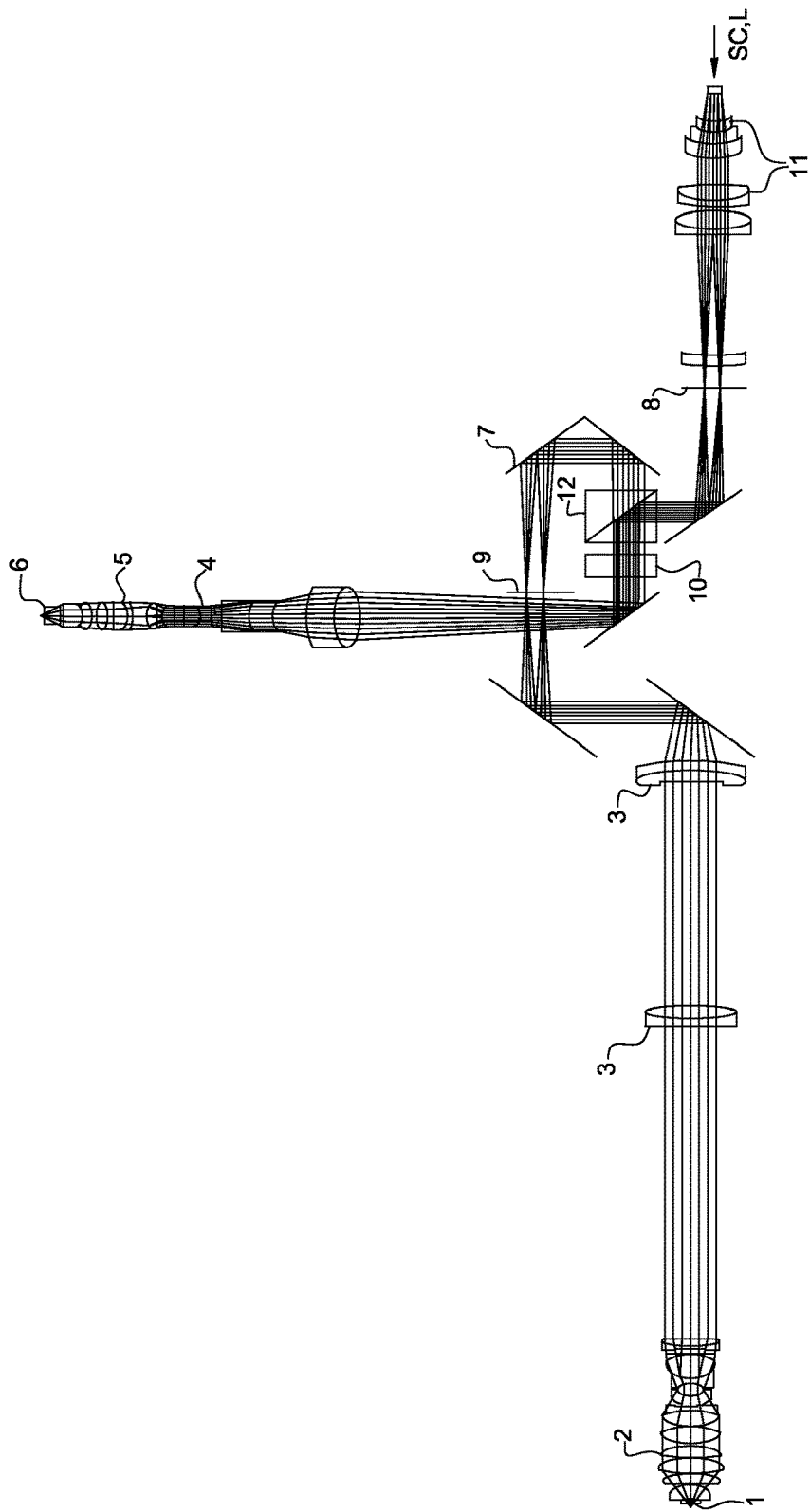

FIGS. 4 and 5 show the beam path according to the invention of a scanning microscope, preferably with pulsed laser illumination for multiphoton excitation in a schematic representation.

The reference signs have the following meanings:
1—object plane; 2—first objective 1; 3—first tube lens 1; 4—second tube lens 2; 5—second objective 2; 6—first intermediate image plane and mirror S; 7—beam deflector/reflector mirror; 8—reference plane; 9—second intermediate image plane; 10—quarter-wave plate; 11—scan lens; 12.1,12.—polarizing beam splitter; TS—dividing mirror; DE—detector; S1, S2—deflecting mirror; A—control unit FIG. 4 shows a schematic representation of an array according to the invention for fluorescence microscopy by means of single photon fluorescence excitation and/or multiphoton excitation. In the case of multiphoton excitation, time-varying light distribution is generated by means of a short pulse laser L, which can be modulated, an X/Y scanning mirror SC and scanning optics SO via a mirror SP, which is deflected in the reference plane (8) and which is to be imaged in the object plane (1) with diffraction limitation. Tube lens 2 (4) and objective 2 (5) initially create an image in the first intermediate image plane (6), in which a mirror (S) is positioned that is capable of quick axial movement and reflects the light back onto itself. As the light passes through the quarter-wave plate (10) twice, a rotation of polarization occurs, which leads to the reflection of returning light at the polarizing beam splitter (12). The beam deflector (7) as well as the deflecting mirrors (S1, S2) guide the illumination light to the actual microscope comprising a tube lens 1 (3) and objective 1 (2), which is thusly imaged in the object plane (1).

There, fluorescent light generated in the focus is collimated by objective 1 (2) and deflected by the dividing mirror (TS) towards the detector located in a pupil plane. Axial sliding of the beam deflector (7) and the system, made up of tube lens (4), plate (10), objective 2 (5) and mirror S (6), allows for the spherical correction of the optical array.

The adjustability of each is schematically indicated with arrows. In this manner, sub-variants, for example, of the 20x/1.0 apochromat design objective can be interchanged with each other on the object side and supported by the same optical system. That way, objectives with and without coverslip correction can be used, and corrections to index of refraction errors can be corrected, for example, via its temperature drift.

By using a partially light-transmissive dichroitic mirror SP in the beam path returning from the specimen, upon single photon excitation by means of a suitable excitation laser L, the fluorescent light is reflected out in the direction of a confocal detection arrangement S conf, made up of a pinhole aperture and a detector or a spatially-resolving detector, the elements of which are arranged confocally in a manner known per se.

FIG. 5 further illustrates the optical beam path as well as the scanning optics (11) of a laser scanning microscope on the side facing the polarizing beam splitter (12) with regard to the reference plane (8), in which the scanning illumination of the specimen is achieved by means of a short pulse laser L (not shown) for multiphoton excitation via a two-dimensional scanner SC (not shown).

Figure 6:
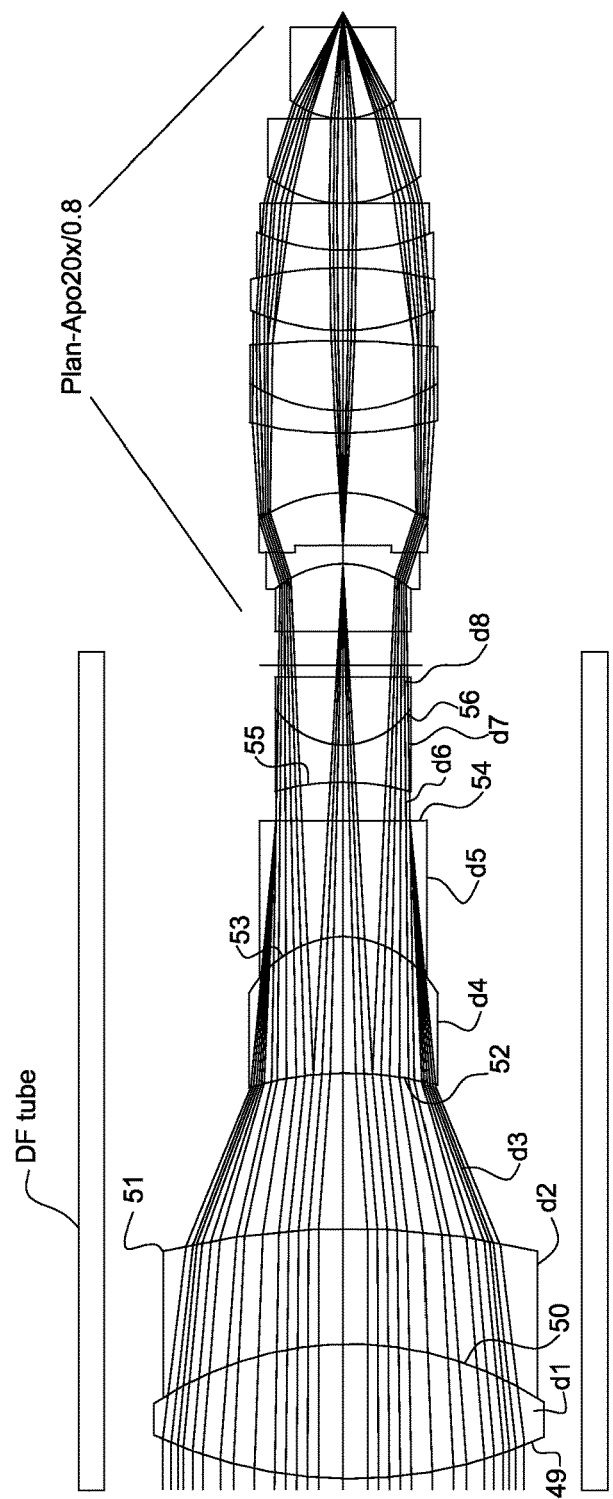
FIG. 6 is a schematic illustration of a tube lens, which, in cooperation with an objective, creates an optical system according to the invention.

FIG. 6 shows an example of a tube lens 2 (4), which, in cooperation with the PlanApo 20x/0.8 objective, creates an optical system according to the invention, which transfers the corrected reference plane following the scan lens and the corrected image of the microscope into a strongly aberrant intermediate image in which the mirror S (6) determines the object plane to be illuminated or viewed.

The description is followed by examples, in Table 1, of optics with the usual tolerances for the elements of TL2. The table includes the plane number, the thickness and the material used for the lens.

In the specific case of the embodiment shown here (n=1.32 and n'=1), according to equation (10) $\xi$=1.27 and the magnification M=1.68 instead of (8) M=1.32.

Modifications by a person skilled in the art within the scope of the invention are possible without limitation and are included in the scope.

Figure 7:
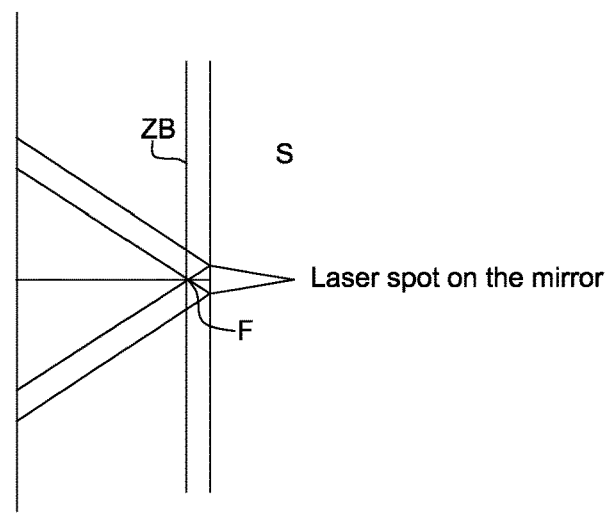
FIG. 7 shows a schematic depiction of a section of the optical conditions with the microscope objective 5 in FIGS. 4-6.

FIG. 7 shows a schematic depiction of a section of the optical conditions with the microscope objective 2 (5) in FIGS. 4-6.

The laser focus (F) generated in the intermediate image is located at a distance from the mirror plane, such that the laser has a magnified spot diameter on the mirror layer in accordance with the invention, thereby distributing the laser energy over a larger surface. The energy density in the mirror layer thus remains below the destruction threshold for the reflecting layer in use.

Figure 8:
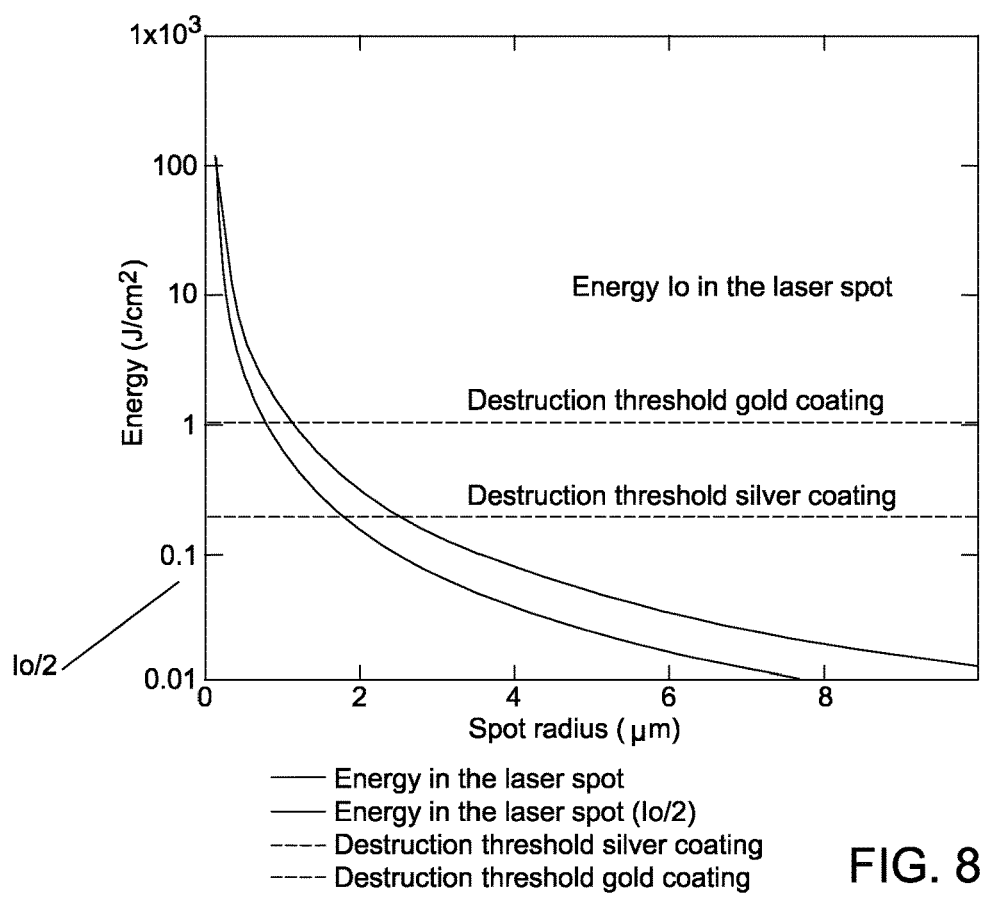
FIG. 8 shows the laser energy density depending on the laser spot radius, along with the threshold values for the destruction of a silver or gold layer.

FIG. 8 shows the laser energy density depending on the laser spot radius, along with the threshold values for the destruction of a silver or gold layer.

The upper curve represents the maximum laser spot energy Io arriving at the mirror of a Ti:Saphire laser such as would be used for multiphoton excitation in the microscope, while the lower curve is based on the assumption of a loss resulting from passing through optical components, to Io/2.

For the laser used in this case, we must assume that, at the maximum laser intensity of 3 W/cm$^2$, up to 1.5 W/cm$^2$ of time-integrated power can reach the reflecting plane. The critical pulse energy that such a metallic reflecting layer can withstand falls within a range of 0.1 and 1 J/cm$^2$. This implies that, to be on the safe side, the laser spot diameter should not be smaller than 3 µm, and the distance of the mirror from the intermediate image must be at least four depths of focus. A larger distance is always permitted. Naturally, this is scalable with the specifications of the laser system in use.

Figure 9:
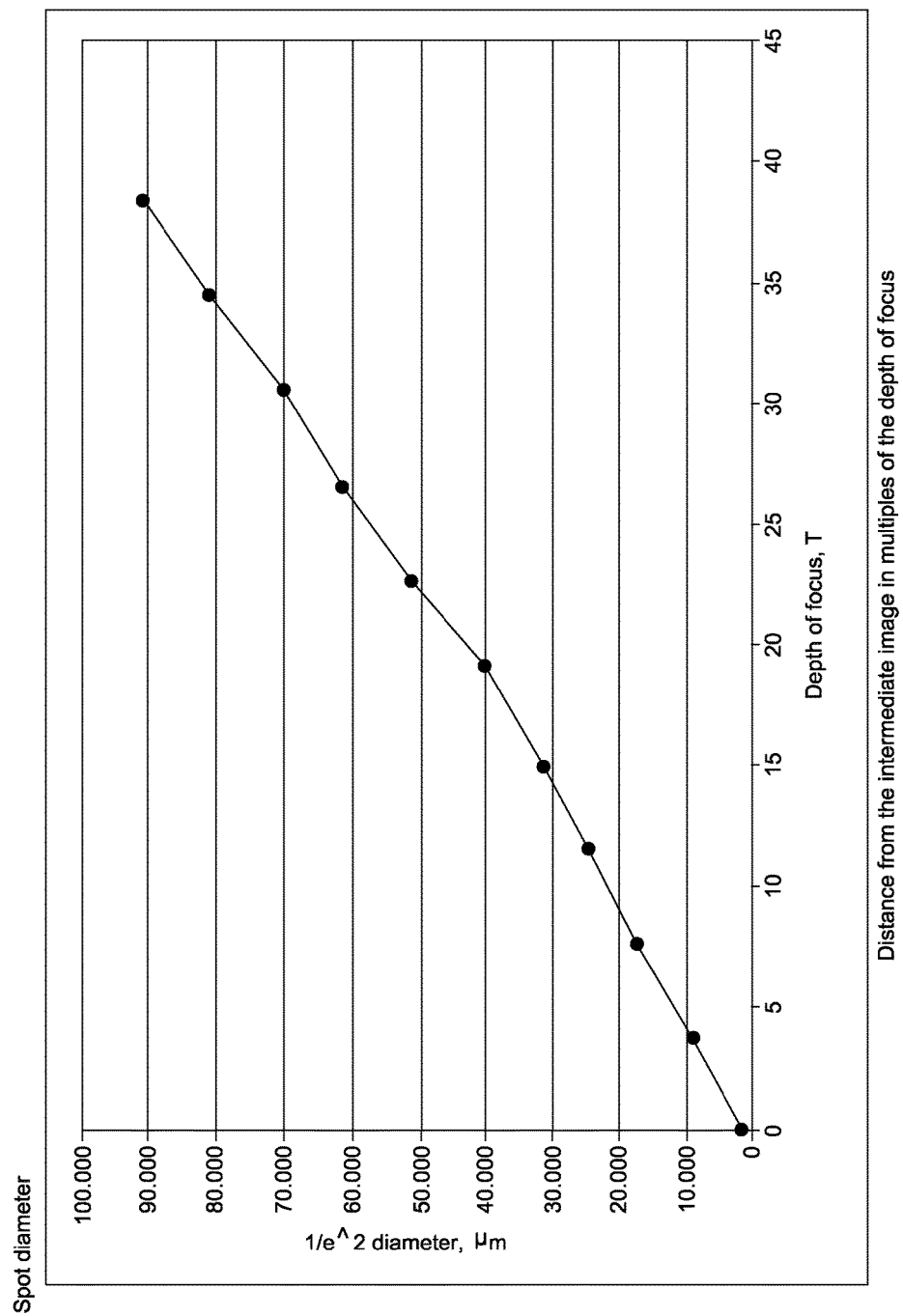
FIG. 9 is a graph showing an exemplary spot diameter (vertical axis) on the reflecting layer, depending on the distance of the mirror from the intermediate image in multiples of the depth of focus (horizontal axis).
Figure 1:
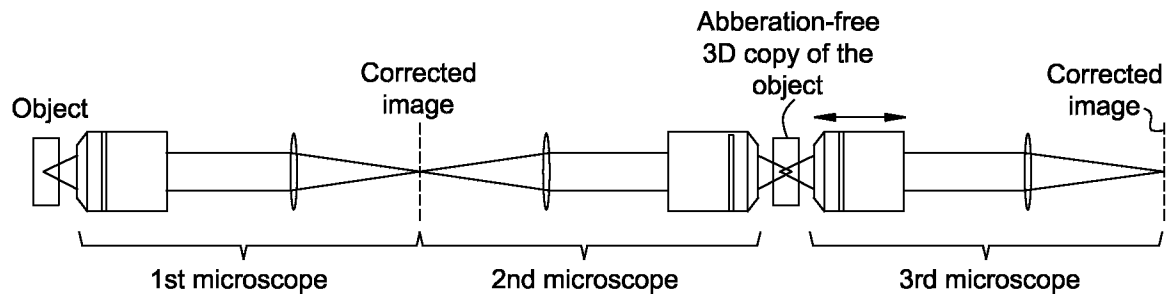
Figure 2:
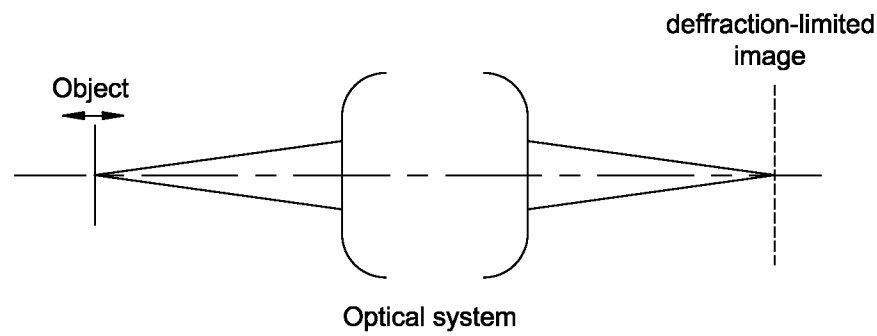

FIG. 9 shows the spot diameter (vertical axis) on the reflecting layer for the present example, depending on the distance of the mirror from the intermediate image in multiples of the depth of focus (horizontal axis).

A person skilled in the art will be able to determine from the curve, according to the invention, the appropriate minimum distance of the reflecting layer from the rearward intermediate image plane.

Advantageously, since the mirror moves quickly along the optical axis, the mirror's operating space will be considered when determining the minimum distance, and distances of, for example, 40 times the depth of focus could and will therefore be implemented by means of the optics used.

When considering the specific examples in FIG. 8, for a required (non-destructive) spot radius of 3 µm according to FIG. 9, a minimum distance of approx. 3-4 T (1/e$^2$) or 4 T at FWHM (full width at half maximum) would advantageously meet the requirements.

For the sake of completeness it may mentioned that the mirrors used behind the objective may be, for instance, commercially available broadband metallic mirrors from the company Newport. For the required gold or silver mirrors, the threshold values indicated there for possible destruction vary between 0.2 J/cm² and 2 J/cm². Dielectric reflecting layers are not suitable for the mirror S (6) as their spectral reflection properties depend on the angle of incidence and they thus would not fully support the high numerical aperture of the optical system.

TABLE 1

(reg. FIG. 6)

| Surface area | Radius | | Thickness | Abbe number | Refractive index |
|---|---|---|---|---|---|
| $\xi = 1.27$ | | | | | |
| S49 | 35.873371 | D1: | 9.559405 | 53.83 | 1.716166 |
| S50 | −24.036897 | D2: | 8.540876 | 23.88 | 1.855017 |
| S51 | −51.304435 | D3: | 11.504554 | | |
| S52 | −24.227765 | D4: | 10.000000 | 28.53 | 1.734311 |
| S53 | −7.865645 | D5: | 8.755412 | 34.70 | 1.725398 |
| S54 | 367.390348 | D6: | 2.613555 | | |
| S55 | −19.071717 | D7: | 3.000000 | 53.27 | 1.625081 |
| S56 | 5.883967 | | 5.263015 | 44.49 | 1.616645 |
| $\xi = 0.9$ | | | | | |
| S49 | 177.108155 | D1: | 5.000000 | 53.83 | 1.716166 |
| S50 | −25.489662 | D2: | 3.000000 | 23.88 | 1.855017 |
| S51 | −56.018234 | D3: | 41.849587 | | |
| S52 | −22.689035 | D4: | 5.000000 | 28.53 | 1.734311 |
| S53 | −6.516752 | D5: | 3.000000 | 34.70 | 1.725398 |
| S54 | −176.733640 | D6: | 1.692480 | | |
| S55 | −24.640317 | D7: | 3.000000 | 53.27 | 1.625081 |
| S56 | 29.310558 | D8: | 3.143901 | 44.49 | 1.616645 |
| $\xi = 1.5$ | | | | | |
| S49 | 43.702487 | D1: | 5.695846 | 53.83 | 1.716166 |
| S50 | −23.800686 | D2: | 5.000000 | 23.88 | 1.855017 |
| S51 | −52.732228 | D3: | 21.343734 | | |
| S52 | −19.202347 | D4: | 3.000000 | 28.53 | 1.734311 |
| S53 | 7.377045 | D5: | 3.000000 | 34.70 | 1.725398 |
| S54 | −30.003611 | D6: | 1.397660 | | |
| S55 | −11.136817 | D7: | 5.000000 | 53.27 | 1.625081 |
| S56 | 4.897050 | D8: | 3.309730 | 44.49 | 1.616645 |

The invention claimed is:

1. A laser scanning microscope comprising:
an excitation laser providing a source of fluorescence excitation,
a scanning mirror arrangement for scanning a specimen with the fluorescence excitation and scanning optics for the generation of a diffraction-limited reference plane as a first intermediate image plane,
a first tube lens and a first microscope objective for aberration-free imaging of a reference plane in a specimen, the first microscope objective and an object side focal plane defining an object space and the first tube lens and an image side focal plane defining an image space,
an optical system for imaging of the reference plane into a second intermediate image in a second intermediate image plane, the optical system having an optical axis and including a second tube lens, a second objective, and an axially movable mirror in the first intermediate image plane, the axially movable mirror being axially movable in a range along the optical axis of the optical system,
a beam splitter arrangement between the reference plane and said optical system,
wherein:
imaging of the image of the second intermediate image plane in the specimen is effected with
a magnification M of the second intermediate image plane in the specimen according to the equation $$M = \frac{y'}{y} = \frac{n}{n'}\xi$$

with $|\xi| \neq 1$
wherein y and y' are the coordinates of points on axes orthogonal to the optical axis in the object and image spaces, respectively, of the microscope, n is the refractive index of a medium in the object space at the specimen, n' is the refractive index of a medium in the image space at the axially movable mirror, $\xi$ is a factor by which the ratio $$\frac{n}{n'}$$

must be multiplied to equal the ratio $$\frac{y'}{y}.$$

2. The laser scanning microscope according to claim 1, wherein the excitation laser is a short pulse light source for multiphoton excitation.

3. The laser scanning microscope according to claim 1, wherein the optical system has a numerical aperture greater than 1.

4. The laser scanning microscope according to claim 3, wherein the optical system provides demagnified imaging of the reference plane.

5. The laser scanning microscope according to claim 1, further comprising a detector located in a pupil plane of the first microscope objective, for descanned detection of emission fluorescence coming from the specimen and a color splitter mirror for reflecting out emission fluorescence coming from the specimen, in the direction of the detector.

6. The laser scanning microscope according to claim 1, further comprising a confocal detector arrangement and a decoupling mirror for reflecting out emission fluorescence coming from the specimen, in the direction of the confocal detector arrangement.

7. The laser scanning microscope according to claim 6, wherein the decoupling mirror reflects out single photon fluorescent excitation.

8. The laser scanning microscope according to claim 1, wherein the excitation laser has a focal plane generated by the optical system, and the focal plane of the excitation laser deviates from a position of the axially movable mirror on the optical axis of the optical system, across substantially all of the range of axial movement of the axially movable mirror in the first intermediate image plane.

9. The laser scanning microscope according to claim 1, wherein the beam splitter arrangement guides the fluorescence excitation in the direction of the specimen.

10. The laser scanning microscope according to claim 1, wherein the beam splitter arrangement spatially splits fluorescence excitation from the excitation laser flowing back and forth.

11. The laser scanning microscope according to claim 1, wherein $\xi$ has a value greater than or less than 1.

12. The laser scanning microscope according to claim 11, wherein $\xi$ has a value selected from the group consisting of 0.9, 1.5, and 1.27.

13. The laser scanning microscope according to claim 1, wherein the second microscope objective of said optical system has substantially the same optical properties as the first microscope objective.

14. The laser scanning microscope according to claim 1, further comprising a polarizing beam splitter, wherein the polarizing beam splitter and a quarter-wave plate split the passing incident and reflected excitation light.

15. The laser scanning microscope according to claim 1, wherein the second tube lens and the second microscope objective of said optical system create a demagnified and defocused intermediate image of the reference plane.

16. The laser scanning microscope according to claim 15, wherein the axially movable mirror reflects a beam from the excitation laser back through the second microscope objective and the second tube lens of the optical system.

17. The laser scanning microscope according to claim 1, further comprising means for the spectral separation of excitation fluorescence from the excitation laser and emission fluorescence returning from the specimen.

18. The laser scanning microscope according to claim 17, wherein the means for the spectral separation of excitation fluorescence and the emission fluorescence is a dichroitic mirror.

19. A laser scanning microscope comprising:
an excitation laser providing a source for fluorescence excitation,
a scanning mirror arrangement for scanning illumination of a specimen and scanning optics for the generation of a diffraction-limited reference plane as a first intermediate image plane,
a tube lens and a first microscope objective for aberration-free imaging of the reference image plane in a specimen, the first microscope objective and an object side focal plane defining an object space and the tube lens and an image side focal plane defining an image space,
an optical system for imaging of the reference plane into a second intermediate image in a second intermediate image plane, the optical system including a second tube lens, a second objective, and an axially movable mirror in the first intermediate image plane, the axially movable mirror being axially movable in a range along the optical axis of the optical system,
a beam splitter arrangement between the reference plane and said optical system,
wherein at least one of:
(a) imaging of the image of the second intermediate image plane in the specimen is effected with a magnification of $M \neq n/n'$, where n is the refractive index of an immersion medium in the object space at the specimen, n' is the refractive index of an immersion medium in the image space at the axially movable mirror, and n/n' is the quotient of the refractive indexes n, n'
and
(b) the excitation laser has a focal plane generated by the optical system, and the focal plane of the excitation laser deviates from an axial position of the axially movable mirror across substantially all of the scanning area of the axially movable mirror in the first intermediate image plane, such that at least one of:
(1) a laser spot produced by the excitation laser on the axially movable mirror surface area has a maximum energy density that remains constantly below the destruction threshold of the axially movable mirror layer
and
(2) the image of the surface area of the axially movable mirror in the object space is located at least four depths of field from the focal plane of the excitation laser in the object space
and
(c) the second intermediate image includes aberrations.

* * * * *

UNITED STATES PATENT AND TRADEMARK OFFICE
CERTIFICATE OF CORRECTION

PATENT NO. : 10,345,567 B2
APPLICATION NO. : 13/968220
DATED : July 9, 2019
INVENTOR(S) : Artur Degen et al.

It is certified that error appears in the above-identified patent and that said Letters Patent is hereby corrected as shown below:

Delete Page 2 and replace with the attached Page 2 showing the corrected number of drawings.
Delete Drawing Sheets 1-6 and replace with the attached Drawing Sheets 1-8 consisting of added FIGS. 3A and 3B.

Signed and Sealed this
Twenty-sixth Day of November, 2019

Andrei Iancu
*Director of the United States Patent and Trademark Office*

$$M = \frac{y'}{y} = \frac{n}{n'}\xi,$$

with $|\xi| \neq 1$, and/or the focal plane of the laser deviates from the axial position of the axially movable mirror across its scanning area in the second intermediate image plane.

19 Claims, 8 Drawing Sheets

(58) Field of Classification Search
USPC ........ 359/383, 362, 377, 378, 656–661, 719,
359/385, 380; 368/362; 377/376;
382/392, 74; 384/368; 367/362;
644/660, 661; 646/661; 656/642, 643;
358/362
See application file for complete search history.

(56) References Cited

FOREIGN PATENT DOCUMENTS

| | | |
|---|---|---|
| EP | 0835423 A1 | 4/1998 |
| EP | 0500717 B2 | 11/2003 |
| EP | 0932845 B1 | 1/2008 |
| EP | 2146235 A1 | 1/2010 |
| WO | 2008/078083 A1 | 7/2008 |

\* cited by examiner